United States Patent Office 3,386,879
Patented June 4, 1968

3,386,879
PROCESS FOR FORMING BOARD CONTAINING CELLULOSIC FIBERS, THERMOSETTING BINDER AND PINEWOOD RESIN
Maxwell M. Yan and Stanley H. Baldwin, Sault Ste. Marie, Ontario, Canada, assignors to Abitibi Power & Paper Company, Limited, Iroquois Falls, Ontario, Canada, a corporation of Canada
No Drawing. Filed Apr. 12, 1965, Ser. No. 447,561
Claims priority, application Canada, Mar. 9, 1965, 925,164
4 Claims. (Cl. 162—127)

ABSTRACT OF THE DISCLOSURE

A method for making a medium density building board by forming an aqueous slurry of lignocellulosic fibres, incorporating in the slurry a thermosetting binder and a thermoplastic pine wood resin, partially dewatering to provide a wetlap, hot pressing the wetlap and baking the product to provide a building board having a specific gravity between 0.45 and 0.80.

---

This invention is concerned with a process for making a medium density building board and, in particular, a medium density building board which is suitable for use as siding and the like, especially for exterior siding.

The general methods used for making medium density building board include reducing wood chips to fibre, forming an aqueous slurry of the fibre and incorporating in such slurry a binder, following which the furnish is formed into a wetlap on a fourdrinier and hot pressed to a specific gravity of above 0.45 and less than 0.80.

Previously, the method for making medium density board of this type involved pre-drying of the wetlap to complete or near dryness prior to hot pressing, then hot pressing at or to dryness. This pre-drying step necessitates the use of large capacity, expensive circulating hot air dryers to remove the large volume of water in the wetlap, this volume being ten times the amount removed in the bake ovens of the process of this invention and the use of higher pressure-higher temperature (to 500° F.) hot presses to consolidate the dried and hence much less compressible mat. Furthermore, it precludes the use of thermosetting binders such as phenol formaldehyde resins, used and most desirable in fibreboard for their stabilizing and strength property potential, since such thermosetting binders cure prematurely in the pre-drying stage and do not retain their life for the final consolidation duing hot pressing. Thermoplastic binders alone, therefore, must be used. Such thermoplastic binders are very desirable for imparting resistance to both water absorption and board weathering effects but they are very toublesome to use in such a dry mat, high temperature pressing process since they flow under these severe conditions and cause serious press sticking, thus necessitating the additional employment of release agents on the surface such as talc or clay. These not only increase cost and introduce application problems but are also injurious to the paintability of the final pressed board surface since they make the achievement of good bonding of the subsequently applied primer paint difficult. In addition, the usually employed thermoplastic resin (a pine stump derivative) emits volatiles during the hot pressing which can cause blistering under such severe press temperatures. Also, the board made with thermoplastic resin alone is soft and vulnerable to handling damage in its immediate hot pressed state until subsequently cooled.

Although thermosetting resins, such as phenolic resin, impart excellent strength properties when used in the wet screen-back process (without drying prior to hot pressing), it has been found that when used alone in medium density board internal delamination and checking of the edges may occur when the board has been subjected to weathering. Such a board is thus questionable for exterior applications such as siding. Thermoplastic resins, such as pine wood resin, when used alone give good stability to weathering, with no edge checking and no internal failure, but produce a produce of relatively low strength, especially in the dry medium density board process. Such boards are more susceptible to breakage during handling and installation in the long lengths normally used.

The object of this invention is to provide a process for making medium density building board in which the disadvantages referred to above are avoided.

A further object of this invention is to provide a process for making medium density building board which can conveniently be carried out using conventional equipment of the type used for making screen-back hardboard and without the process difficulties heretofore associated with the manufacture of medium density siding in the more complex pre-drying systems used for making board which is smooth on two sides.

Another object of this invention is to provide a process which will give improved property development at reduced overall binder cost.

In accordance with the invention the binder is the combination of a thermosetting resin and a thermoplastic resin. The wetlap is hot pressed without pre-drying with the result that the thermoplastic resin will not cause sticking, even in the absence of releasing agents. The thermosetting resin partially cures during the hot pressing and effects initial consolidation of the board. The moist hot pressed board is then baked at a temperature above the softening point of the thermoplastic resin during which operation the thermoplastic resin softens and flows into and between the fibres and the curing of the thermosetting resin is completed. Softening of the thermoplastic resin may also occur during hot pressing. It has been found that this process gives, in addition to strength, a water resistance and a degree of plasticity to the product which enables it better to absorb the strains of the moisture and temperature extremes encountered during weathering. The final poduct will have excellent strength and excellent resistance to edge checking, internal delamination, and other weathering effects.

In accordance with the preferred procedure, wood chips are heated with steam under pressue and mechanically refined to provide fine fibres which are then dispersed in the form of an aqueous slurry. A water soluble, acid-pecipitable phenol formaldehyde resin solution of the highly caustic, advanced Redfern type, 0.5 to 3% and preferably about 1%, is added to the slurry. The standard wet process hardboard phenol formaldehyde resin solutions known under the trade names PF-24 and SW-1140 are suitable. Alternatively, a variety of other thermosetting binders which will set under the described hot press conditions of this invention can be used. These include melamines, acrylics, resorcinols, urea formaldehydes and proteins, such as blood albumen.

About 5 to 20% and preferably about 15% of a relatively low cost solid thermoplastic pine wood resin having a softening point below the final bake temperature is also added to the slurry, in a finely pulverized dry state, an alkaline solution precipitable by acid, or an aqueous dispersion. The latter form is preferred. A suitable resin is that known under the trade name Vinsol. Vinsol is derived from southern pine wood stumps and has the following approximate properties.

| | |
|---|---|
| Softening point (Hercules drop method), ° F. | 248 |
| Acid number | 94 |
| Saponification number | 165 |
| Unsaponifiable matter (A.S.T.M. D1065) percent | 7.7 |
| Acetone insoluble do | 0.05 |
| Petroleum ether insoluble do | 98 |
| Density at 77° F. g./cc | 1.218 |

Other pine wood resins of similar properties may also be used. Alternatively, other thermoplastic binders may be used having softening points below the final bake temperature, such as petroleum-derived hydrocarbon resins and asphaltic materials such as the product having a softening point in the range 220 to 240° F.

In addition, it is advantageous to add small quantities of well-known fibreboard sizing agents such as 0.25 to 1% and preferably 0.5% of wax solids in the form of acid-precipitable emulsions.

After the foregoing components have been added to the fibre slurry about 0.5 to 1.5% of alum together with sufficient sulphuric acid to bring the pH to about 4.5 are added to cause precipitation and fixing of the binder and size. Alternatively, ferric sulphate may be used in place of the alum-acid combination to effect precipitation and add a colour effect as well as additional strength to the board. All percentages given are solids based on the final total dry board weight.

The furnish is formed into a wetlap on a fourdrinier or by other conventional means such as a cylinder machine and partially dewatered to a solids content of about 25 to 40%, usually about 30% (the moisture content is therefore about 60–75% and could be further reduced to 50% by a high pressure flat pressing stage), cut into appropriate lengths, placed on carrying screens and conveyed into a hot press at the aforementioned solids content. An overlay of finely ground fibre in slush or paper form can be laid on the top surface of the partially dewatered wetlap before it is cut to length to improve surface paintability and weatherability.

The hot press includes stop bars of appropriate thickness to prevent the mat from being compressed below the desired caliper and hence above the desired density. The stop bars are slotted to allow expressed liquid water to drain away. Press platen temperatures are in the order of 360 to 410° F. and pressure is the minimum practical pressure to bring the press onto the stops quickly and to achieve the desired caliper and density. It is advantageous to reach stops in the minimum possible time, without damaging the wet mat, in order to achieve minimum press cycles (maximum production) and to control caliper uniformity in the multi-opening press normally used. Typically, initial closing pressures will be about 100 p.s.i. but as soon as stops are reached (within the first minute of the cycle) pressures as low as 5 p.s.i. can be used. Press times as low as ten minutes can be used for a nominal 7/16-inch thick siding board but usually fifteen to twenty minutes will be employed. At the end of the hot pressing the moisture content is preferably about 15 to 25%. It is possible to remove the board from the press and transfer it to the bake oven without damage due to the stiffness imparted by the thermosetting resin. There is therefore a reduction of press cycle and consequent saving of cost where the preferred moisture content is used. However, if desired, the press cycle can be lengthened to give a lower moisture content.

After hot pressing, the moist board is heat treated in a bake oven maintained at a temperature above the softening point of the thermoplastic resin, preferably at about 270 to 290° F., for four to ten hours depending on the temperature and other factors such as moisture content of the board. The final product will have a specific gravity between 0.45 and 0.80 and preferably about 0.65.

A primer coating, such as a solvent-based alkyd type paint, may advantageously be applied to the board. One way of applying a primer is to treat the still warm board immediately after it has been unloaded from the hot press. As an alternative, a primer can be applied to the board subsequent to oven baking and humidification. As indicated previously, an overlay sheet may be added to improve surface paintability and it is important to provide an adhesive system for such overlay which develops a good bond in the hot press. The preferred adhesive system is a vegetable drying oil, particularly one in which a polymerization catalyst of the Friedel-Crafts type is incorporated. A particularly effective system is raw linseed oil with 2 to 10% by weight of boron trifluoride used in the form of its ether or dihydrate complex. Other forms of linseed and other vegetable oils could be used, singly or in admixture, such as tung, oiticica, safflower, dehydrated castor, soya and tall oils.

As has been indicated, in addition to strength an essential requirement of a good exterior siding is excellent weatherability. Apart from actual long-term practical exposure in the field, this property is best exemplified by performance in the A.S.T.M. accelerated aging test D1037–80 (1961) which consists of a series of six completely repeated cycles of exposure to severely contrasting conditions of temperature and moisture. Each cycle is made up in turn of six exposures as follows:

(1) Immersion in water at 120° F. for one hour.
(2) Exposure to steam and water vapour at 200° F. for three hours.
(3) Storage at 10° F. for twenty hours.
(4) Oven heating at 210° F. in dry air for three hours.
(5) Exposure again to steam and water vapour at 200° F. for three hours.
(6) Oven heating at 210° F. in dry air for eighteen hours.

On completion of the test, residual thickness swell and linear dimension changes are determined and observations made of any physical failures such as delamination, cracking, edge checking or surface roughening. Residual physical properties after exposure may also be determined, if desired.

The following working examples of actual board manufacture will further describe the invention.

Example 1

In a mill run, wood chips were heated with steam under pressure and mechanically refined to a good quality free draining fibre. To an aqueous fibre slurry in the stock chest were added 15% Vinsol, 1% PF–24 phenolic resin, and 0.5% Paracol 505N wax emulsion. After being mixed to effect dispersion there were precipitated by the addition of 1% alum plus the required amount of sulphuric acid to bring the pH to 4.5. All percentages are solids on final dry board weight.

The resulting furnish was then formed into a wetlap, having a basis weight of 1350 lb. solids/1000 sq. ft., on a fourdrinier and partially dewatered by conventional suction boxes and a wet press section to a solids content of 28%. The wetlap was then sawn into 16 ft. lengths, placed on carrying screens and conveyed into the hot press at the 28% consistency.

The hot press was fitted along the long edges of each opening with slotted stop bars of appropriate thickness. Press temperature was 395° F. The press was closed under 100 p.s.i. pressure and the wet mat compressed to stops in thirty seconds at which point the pressure was immediately dropped to 40 p.s.i. The press was kept closed on stops for twenty minutes then opened, the boards removed and the carrying screens separated from the boards.

The hot-pressed board was then heat treated in a conventional hardboard bake oven for six hours at 280° F., passed through a humidifying chamber and then fabricated into desired shapes and sizes of siding.

The board contained 15% moisture as it emerged from the hot press and tests on the final baked, humidified board showed it had excellent quality for a siding, with the following physical properties.

| | |
|---|---|
| Moisture at test _____ percent__ | 4.5 |
| Caliper _____ in____ | 0.42 |
| Specific gravity _____ | 0.64 |
| Water absorption (24 hr. immersion under 1 in. water at 70° F.) _____ percent__ | 16 |
| Swell (24 hr. immersion under 1 in. water at 70° F.) _____ percent__ | 3.5 |
| Modulus of rupture _____ p.s.i__ | 2500 |
| Tensile strength perpendicular to surface ___ p.s.i__ | 42 |
| Accelerated aging—A.S.T.M., 6-cycle exposure— residual caliper swell _____ percent__ | 10 |

Example 2

Board was made as described in Example 1 except that a 32 lb./ream (3000 sq. ft.) uncoated groundwood type sheet was laid on the top surface of the partially dewatered wetlap before it was cut to length for pressing. The natural interfibrous bonding of the overlay to the base board was reinforced by the use of 3 lb./1000 sq. ft. of a mixture comprising raw linseed oil containing 5% by weight boron trifluoride, applied to the under side of the sheet prior to the sheet being laid on the wetlap.

Subsequent hot pressing and post-baking was the same as in Example 1.

After fabrication, the overlayed board was primed in a separate paint line on back, edges and face with a solvent-based alkyd type paint.

Example 3

Laboratory boards were made following the procedure in Example 1 except that the pressing time was ten instead of twenty minutes, the post-bake oven temperature was raised from 280 to 295° F., and the baking time was increased to ten hours.

Moisture content of this board out of the press was 25% and after baking and humidfying, a board of comparable quality to that obtained in Example 1 was achieved.

Example 4

Board was made as described in Example 1 except that primer paint was applied to the top and back surfaces of the still warm panels as they emerged from the hot-pressing operation. Post-baking was carried out on the primed panels as described in Example 1. Again a product of high quality with excellent primed surfaces resulted.

Example 5

Board was made as in Example 1 except that basis weight was increased to yield a board of 0.75 specific gravity. Although this board was heavier it was also considerably stronger, the modulus of rupture or M.O.R. being 4200 p.s.i., and the tensile strength perpendicular to surface or P.T.S., 60 p.s.i., and thus it was suited for more demanding end use applications. Suprisingly, it was also found that the press cycle did not have to be lengthened to produce this heavier board. It is suspected that this is due to better heat transfer in the denser board and hence greater press curing efficiency.

Although the foregoing examples are confined to a nominal 7/16-inch thickness board, the product of this invention can, of course, be made in other thicknesses, as desired, by appropriate adjustment of basis weight, stop thickness, and pressing time.

Example 6

To demonstrate the advantage of the invention, particularly with respect to optimizing the important quality of excellent weatherability by using the combination of Vinsol and phenolic resin in the wet-pressing process, the following experiment was performed.

Three boards were made, all by the same general "wet" process described in Example 1, but differing in binder additive, as follows:

Board A—3% phenolic resin.
Board B—20% Vinsol resin.
Board C—15% Vinsol and 1% phenolic resin.

Samples of these boards were compared in weatherability by subjection to the A.S.T.M. accelerated aging test previously described. Examination of the samples upon completion of the test demonstrated the superior weathering durability attained with the process of the invention. By comparison to the board (C) in accordance with the invention, the board made with Vinsol alone (B) was badly swollen, with a residual thickness swell of 34% compared to 10% for (C). The sample using phenolic resin alone (A) exhibited severe internal cracking and delamination, whereas board (C) was free of this defect.

Example 7

The fact that the phenolic resin in the wet-pressing process partially sets up during the hot pressing, even at the high moisture content of the mat, and thereby adds strength to the in-process board so that it is less susceptible to damage during subsequent process handling is shown by the following experiment.

Boards made by the wet process with 20% Vinsol binder alone and with the combination of 20% Vinsol and 1% phenolic resin, and also a board made by the dry-pressing process with 20% Vinsol, were all individually tested for stiffness immediately after hot pressing by measuring deflection caused by a given load applied over a given span. The wet-pressed Vinsol-phenolic board was much stiffer at this process stage, deflecting 50% less than the wet-pressed Vinsol board. The dry-pressed Vinsol board broke as soon as the load was applied showing very poor out-of-press strength.

Example 8

The ineffectiveness of phenolic resin or similar thermosetting binders in the smooth-two-side type process where the wet mat is pre-dried before hot pressing is illustrated by the following example.

Two boards made by the smooth-two-side dry-pressing process, one having 1% PF-24 phenolic resin binder added and the other with no binder at all, showed the following properties.

TABLE I

| | Cal., in. | Sp. Gr. | 24 Hr. Water Immersion | | M.O.R., p.s.i. | M.O.E.,[1] p.s.i. | P.T.S., p.s.i. |
|---|---|---|---|---|---|---|---|
| | | | Wt. Inc., Percent | Swell, Percent | | | |
| No binder_____ | 0.45 | 0.52 | 47 | 19 | 800 | 1.3×10⁵ | 7 |
| 1% phenolic resin binder. | 0.44 | 0.53 | 50 | 17 | 700 | 1.5×10⁵ | 7 |

[1] Modulus of elasticity.

No property development has taken place during hot pressing with the phenolic resin because the resin has already set up prematurely during the pre-hot press drying stage and has no life left. Thus the use of these desirable thermosetting binders is precluded when the smooth-two-side type dry-pressing process is used.

Example 9

The effectiveness of hot pressing at high moisture content, according to the process of this invention, in controlling the troublesome sticking usually encountered in the previously used dry-pressing process with thermoplastic binders such as Vinsol was demonstrated by hot pressing medium density board mats containing 20% Vinsol binder in both the wet and completely dry condition at a wet process press temperature of 395° F., without the use of release agents. There was no sticking encountered where the mat was hot pressed at high moisture content but serious press sticking occurred on both top and bottom faces of the mat hot pressed in the dry condition—even though the press temperature was lower (and hence also the sticking tendency) than that normally used for the dry-pressing method.

Example 10

Experiments were conducted following the general procedure of Example 1 to investigate the factors influencing sticking.

(a) Effect of mat moisture content entering the hot press on sticking.—Using 15% Vinsol and 1% phenolic and a press cycle of twenty minutes at 400° F. at moisture levels reduced by drying to 0, 10, 20, 30 and 40%, it was found that where stops were used, caul and screen sticking occurred when the mat moisture content was reduced to 10%. There was no sticking at 20% moisture. However when the phenolic resin was excluded, sticking started at the 20% moisture level. A mat made using 15% Vinsol and 1% phenolic resin dried to 20% moisture and then hot pressed at 400° F. for twenty minutes but without stops exhibited fibre plucking or sticking on the caul plate.

It was noted that all boards produced in the 0 to 40% moisture range failed to develop the slick hard top skin normally present when the mat is pressed at the regular 65 to 75% moisture level.

(b) Skin formation versus release.—Mats having a moisture content in the range 65 to 75% were pre-pressed in the hot press for three minutes and eight minutes respectively using oversized three-quarter inch stops to limit moisture loss by the mat and this enabled partial surface skins to be formed on an essentially wet mat. These mats were then dried completely in an oven, and repressed using normal hot press cycles of twenty minutes at 400° F. Even though the mat was dry no sticking was observed with the eight minute skin. With the three minute skin there was slight sticking in one case and clean release in a repeat. In the first case the mat blistered when pulled from the press and the consequent disruption of the surface probably caused the slight sticking.

Having regard to the examples and experiments described above the following résumé is provided of the various factors involved:

(1) The use of thermosetting resin (a) This gives final strength to the product.
(b) By contrast to thermoplastic resin alone, gives stiffness immediately out of the hot press, and hence reduces mechanical damage on subsequent handling. This is particularly important in the cost-saving reduced press cycle boards which are wetter and hence weaker at this out-of-press stage.
(c) Reduces sticking tendencies, but this is distinctly significant only when there is pre-drying far below the 60 to 75% moisture content into the hot press contemplated by this invention.

(2) Thermoplastic resin (a) It improves overall properties, and, in particular, resistance to water penetration.
(b) It avoids delamination after weathering.

(3) Avoidance of pre-drying (a) This saves equipment and hence reduces product cost; because a predryer is not needed, building board can be made on a standard smooth-one-side hardboard line, with minor modification only.
(b) It avoids presetting and loss of strength of the thermosetting resin.
(c) Sticking is avoided.
(d) A skin is formed due to the searing action of a hot smooth surface of the press on the wet fibre mat and this not only contributes to the avoidance of sticking but also improves the durability and scuff resistance of the surface.

(4) Final moisture out of press

Due to the stiffening effect of the thermosetting resin it is possible to take the board out of the hot press at a moisture content of about 15 to 25% to give a cost-saving reduced press cycle.

We claim:

1. A process for making a medium density building board comprising the steps of forming an aqueous slurry of lignocellulosic fibres, incorporating in such slurry a thermosetting binder and a thermoplastic pine wood resin, partially dewatering the slurry to provide a wetlap having a moisture content of about 50–75%, without drying said wetlap hot pressing said wetlap at a temperature of about 360° to 410° F. and baking the product of said hot pressing at a temperature above the softening point of the resin to provide a building board having a specific gravity between 0.45 and 0.80, said resin being present in an amount of about 5–20%, and said thermosetting binder being present in an amount of about 0.5 to 3%, all amounts being based on the final total dry board weight.

2. A process as in claim 1 in which a primer is applied to the surface of the building board.

3. A process as in claim 1 in which an overlay is applied to the wetlap and a primer is applied to the surface of the building board.

4. A process for making a medium density building board comprising the steps of forming an aqueous slurry of lignocellulosic fibres. incorporating in such slurry about 1% of a phenolic resin and about 15% of a thermoplastic pine wood resin, partially dewatering the slurry to provide a wetlap having a moisture content of about 50 to 75% and hot pressing at a temperature of about 360° to 410° F. the wetlap having such moisture content to provide a board having a moisture content of about 15 to 25% and having sufficient stiffness to enable the board to be transferred from a hot press to a bake oven and baking said board at a temperature above the softening point of the thermoplastic pine wood resin to provide a medium density building board having a specific gravity of between about 0.45 and 0.80, all amounts being based on the final total dry board weight.

References Cited

UNITED STATES PATENTS

| | | | |
|---|---|---|---|
| 2,732,295 | 1/1956 | Hollenberg | 162—165 X |
| 2,990,307 | 6/1961 | Stalego | 162—165 |
| 3,014,834 | 12/1961 | Pattilloch | 162—165 X |
| 3,236,722 | 2/1966 | Box | 162—224 X |

S. LEON BASHORE, *Primary Examiner.*